(12) United States Patent
Lee

(10) Patent No.: US 6,556,334 B2
(45) Date of Patent: Apr. 29, 2003

(54) FLAT PANEL DISPLAY USING MICROELECTROMECHANICAL DEVICE

(75) Inventor: Yong-Keun Lee, Seoul (KR)

(73) Assignee: Hera System Co., Ltd., Daejeon (KR)

(*) Notice: Subject to any disclaimer, the term of this patent is extended or adjusted under 35 U.S.C. 154(b) by 15 days.

(21) Appl. No.: 09/764,404

(22) Filed: Jan. 19, 2001

(65) Prior Publication Data

US 2001/0024310 A1 Sep. 27, 2001

(30) Foreign Application Priority Data

May 15, 2000 (KR) .......................... 2000-25923

(51) Int. Cl.⁷ .............................. G02B 26/02
(52) U.S. Cl. ................ 359/230; 359/233; 359/234; 359/291; 359/295
(58) Field of Search ................ 359/291, 295, 359/233, 234, 230; 385/901; 345/30, 48, 84, 108

(56) References Cited

U.S. PATENT DOCUMENTS 5,771,321 A * 6/1998 Stern ........................ 385/31
6,288,824 B1 * 9/2001 Kastalsky .................. 359/254

* cited by examiner

Primary Examiner—Hung Xuan Dang
Assistant Examiner—Tuyen Tra
(74) Attorney, Agent, or Firm—Antonelli, Terry, Stout & Kraus, LLP

(57) ABSTRACT

There is provided a flat panel display using a microelectromechanical device, comprising a back glass substrate having a transparent electrode of a transparent electric conductor; a front glass substrate having a color filter layer; an micro-electromechanical device formed at the transparent electrode to switch light; and a support beam for supporting the back glass substrate and the front glass substrate. The micro-electromechanical device used in the flat panel display is fabricated by a micro-machining technology, thereby increasing a light utilizing efficiency and remarkably reducing a fabricating cost.

20 Claims, 3 Drawing Sheets

FLAT PANEL DISPLAY USING MICROELECTROMECHANICAL DEVICE

BACKGROUND OF THE INVENTION

1. Field of the Invention

The present invention relates to a flat panel display, and more particularly, to a flat panel display using a micro-electromechanical device for blocking or passing light.

2. Description of the Related Art

FIG. 1 is a cross-sectional view showing a conventional color liquid crystal display.

As shown in FIG. 1, formed at a lower portion of a back glass substrate 2 are a light diffusing plate (not shown) and a polarizing plate 1, and at an upper portion of the back glass substrate 2, there are formed an ITO transparent electrode 3 and an alignment film 4. The light diffusion plate transmits light from a backlight forming a uniform plane light from a fluorescent lamp. In addition, the ITO transparent electrode 3 is a transparent electric conductor, and the alignment film 4 is formed of a thin organic film made of polyimide in order to align liquid crystal molecules. At an upper portion of a front glass substrate 9, there is formed a polarizing plate 10, and at a lower portion of the front glass substrate 9, there are formed a color filter layer 8 arranged in the form of a mosaic, an ITO transparent electrode 7 and an alignment film 6. The color filter layer 8 is made of a resin film containing a dye or paint in three primary colors (red, green, blue). A liquid crystal layer 5 is injected between the back glass substrate 2 and the front glass substrate 9 and is supported by a sealant 11 and a support beam 12. The liquid crystal layer 5 is formed of a twisted-nematic liquid crystal material. The sealant 11 is positioned at an edge of a panel so as to serve as an adhesive for fixing the back glass substrate 2 and the front glass substrate 9. The support beam 12 supports the back glass substrate 2 and the front glass substrate 9.

In an optical switch device using the liquid crystal, as a conventional typical display device, a contrast change of light is excessively changed according to a viewing angle, and it is difficult to display moving images, since the liquid crystal needs a long period of reaction time. Further, there are some problems that the optical switch device exhibits low efficiency in utilizing the light and also needs a separate assembling process to inject and align the liquid crystal, thereby increasing a fabricating cost.

In a conventional mechanical optical shutter, generally, its power consumption is too high, and it is difficult to achieve its rapid operation and restrict its size to several hundred micro meter ($\mu$m). Further, it is also impossible to provide a plurality of the optical shutters used as pixels for displaying an image.

SUMMARY OF THE INVENTION

Accordingly, it is an object of the present invention to provide a flat panel display, which has a high optical switching efficiency and a low fabricating cost, using a micro-electromechanical device as the optical switch device.

According to a first aspect of the present invention, a flat panel display using an micro-electromechanical device comprises a back glass substrate having a first transparent electrode of a transparent electric conductor; a front glass substrate having a color filter layer and a second transparent electrode; an micro-electromechanical device formed at the first transparent electrode to switch light; and a support beam for supporting the back glass substrate and the front glass substrate.

According to a second aspect of the present invention, a flat panel display using a micro-electromechanical device comprises a back glass substrate having a transparent electrode of a transparent electric conductor; a front glass substrate having a color filter layer; an micro-electromechanical device formed at the transparent electrode to switch light; and a support beam for supporting the back glass substrate and the front glass substrate.

According to a third aspect of the present invention, the micro-electromechanical device used in the flat panel display comprises a rotatory shifter rotatably moved by an electrostatic force due to a voltage difference between a shifting electrode and the transparent electrode vertically spaced from the shifting electrode, a mask and a window formed at the rotary shifter, and a support post for supporting the rotatory shifter.

According to a fourth aspect of the present invention, the support post used in the flat panel display is formed to sufficiently support the rotatory shifter, while the rotatory shifter is smoothly rotated.

According to a fifth aspect of the present invention, the mask and the window used in the flat panel display to block light or allow the light to pass therethrough.

According to a sixth aspect of the present invention, the micro-electromechanical device used in the flat panel display is formed in a double wing shape or a single wing shape.

According to a seventh aspect of the present invention, the micro-electromechanical device used in the flat panel display is a reflecting type structure without the window.

According to an eighth aspect of the present invention, the rotatory shifter used in the flat panel display is a structure having 2 to 10 stages.

According to a ninth aspect of the present invention, the micro-electromechanical device used in the flat panel display comprises a lower support post for supporting the horizontal shifter, an upper electrode for helping the optical switching operation, an upper support post for supporting the upper electrode, and a mask and a window formed at the horizontal shifter and the upper electrode.

According to a tenth aspect of the present invention, the horizontal shifter used in the flat panel display is translationally moved by a voltage difference between a voltage applied to the upper electrode and the transparent electrode and a voltage applied to the horizontal shifter.

Recently, a semiconductor processing technology for fabricating a mechanical structure having a size of a few micro meter ($\mu$m) to several hundred micron meter ($\mu$m), i.e. micro-machining technology is applied to a fabrication field of a sensor and an actuator having a size of a micron unit. In the present invention, the micro-machining technology is applied to a fabrication of the micro-electromechanical device used as an optical switch device, and the micro-electromechanical device is used for the display using the liquid crystal. Therefore, the display of the present invention has a high efficiency in utilizing the light. Since the precise semiconductor processing technology having a high productivity fabricates the micro-electromechanical device, the fabricating cost is remarkably reduced, and the pixel size of the display is more reduced.

DETAILED DESCRIPTION OF THE PREFERRED EMBODIMENTS

The objects, characteristics and advantages of the above-described invention will become more apparent by describing the preferred embodiments thereof with reference to the accompanying drawings.

Figure 1:
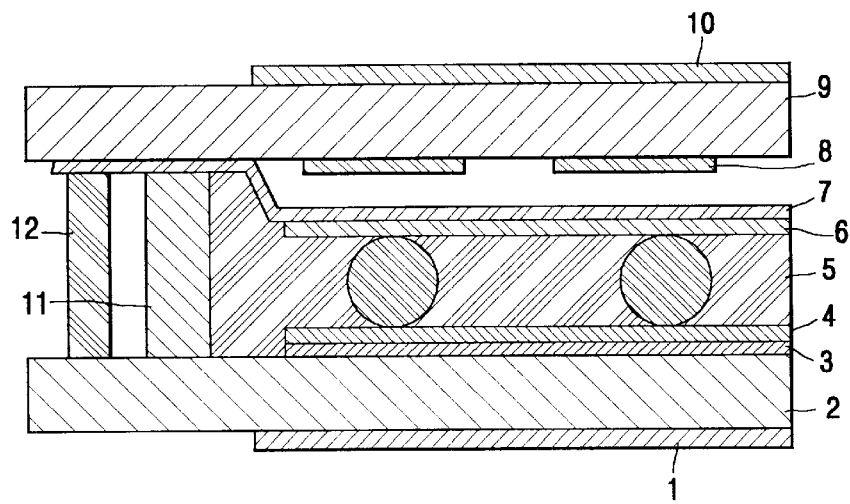
FIG. 1 is a cross-sectional view of a conventional color liquid crystal display.
Figure 2:
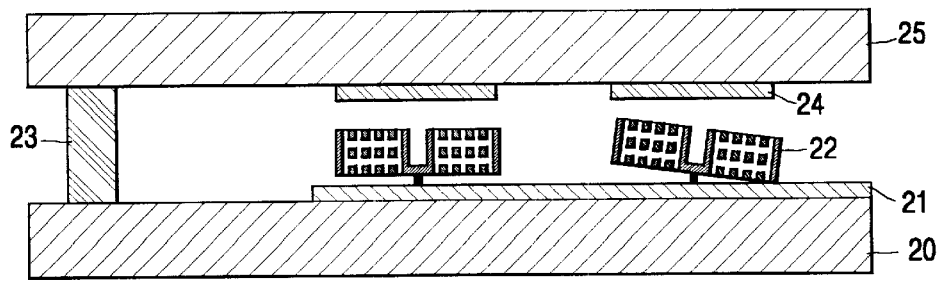
FIG. 2 is a cross-sectional view of a flat panel display using a micro-electromechanical device according to the present invention.

FIG. 2 is a cross-sectional view of a flat panel display using a micro-electromechanical device according to the present invention.

As shown in FIG. 2, a flat panel display according to the present invention has a micro-electromechanical device 22 formed on a back glass substrate 20 including a transparent electrode 21 made of a transparent conductor. Formed on a front glass substrate 25 is a mosaic patterned color filter layer 24 formed of a resin film containing a dye or paint in three primary colors (red, green, blue). Between the front and back glass substrates 25, 20, there is formed a support beam 23 for supporting the front and back glass substrates 25, 20.

Figure 3:
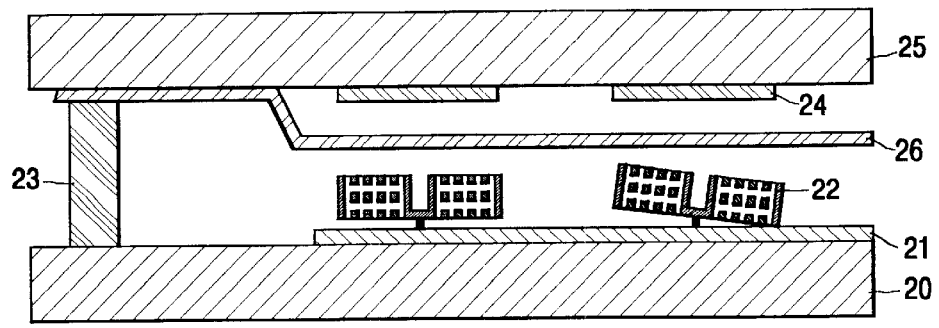
FIG. 3 is a cross-sectional view of the flat panel display using the micro-electromechanical device according to an embodiment of the present invention.

FIG. 3 is a cross-sectional view of the flat panel display using the micro-electromechanical device according to an embodiment of the present invention. As shown in FIG. 3, the flat panel display according to the present invention has a micro-electromechanical device 22 formed on the back glass substrate 20 including a transparent electrode 21 made of the transparent conductor. Formed on the front glass substrate 25 are the mosaic patterned color filter layer 24 formed of the resin film containing a dye or paint in three primary colors (red, green, blue) and a transparent electrode 26. Between the front and back glass substrates 25, 20, there is formed a support beam 23 for supporting the front and back glass substrates 25, 20.

Figure 4A:
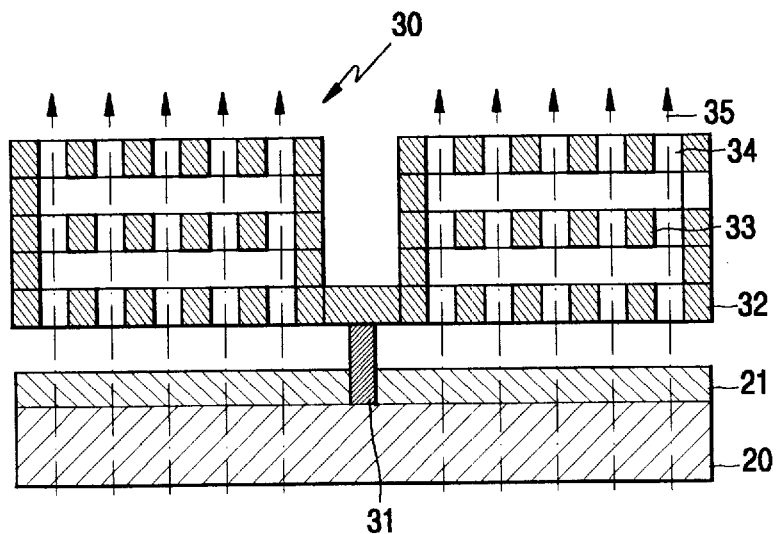
FIGS. 4a and 4b are cross-sectional views of operation principle of a rotatory shifting type micro-electromechanical device according to the present invention.
Figure 4B:
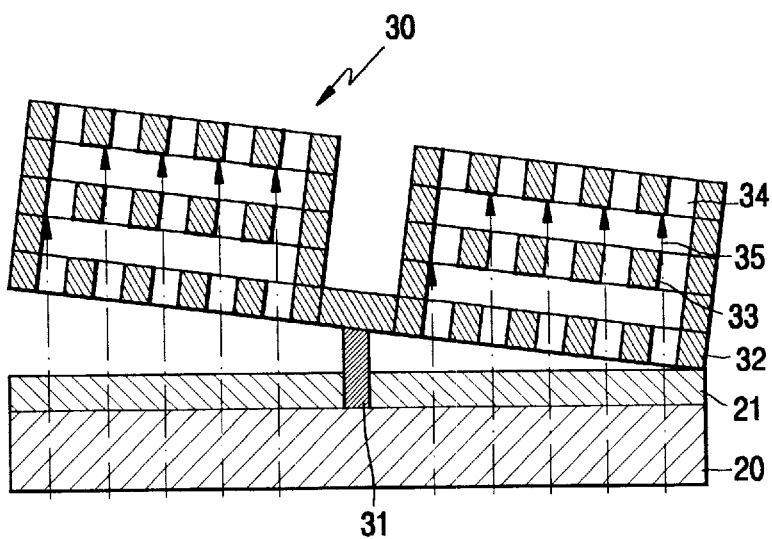

FIGS. 4a and 4b are cross-sectional views of operation principle of a rotatory shifting type micro-electromechanical device according to the present invention.

As shown in FIGS. 4a and 4b, a double wing shaped rotary shifting type micro-electromechanical device 22 includes a rotatory shifter 30, a shifting electrode 32, a support post 31 formed on the transparent electrode 21 of the back glass substrate 20 to support the rotatory shifter 30 and the shifting electrode 32, a mask 33 for helping the micro-electromechanical device 22 in an optical switching operation, and a window 34 formed on the mask 33. The micro-electromechanical device 22 may be formed as a reflecting type without a window or a single wing type according to different embodiments of the present invention.

FIG. 4a shows an initial state in which a voltage is not applied to the transparent electrode 21 of the back glass substrate 20 and the transparent 26 of the front glass substrate 25. In this state, since the rotatory shifter 30 is not rotated and kept in a balanced state, light 35 from a light source is allowed to pass through the window 34 of the mask 33 and arrive on the color filter layer 24. The color filter layer 24 combines the red, green and blue colors to display a desired color.

FIG. 4b shows a driving state in which the voltage is applied to the transparent electrode 21 of the back glass substrate 20 and the transparent electrode 26 of the front glass substrate 25. In this state, a difference in an electrostatic attractive force is occurred by a voltage difference between the upper shifting electrode 32 and the lower transparent electrode 21, or the upper transparent electrode 26 and the lower rotatory shifter 30. The light 35 from the light source is blocked by the rotatory shifter 30, the mask 33 and the window 34 formed on the mask 33. If the light 35 from the light source is blocked, the light 35 does not arrive on the color filter layer 24. Therefore, a black color is displayed. In this situation, if the applied voltage is cut off, the rotatory shifter 30 returns to the initial state. In other words, the support post 31 for supporting the rotatory shifter 30 is elastically deformed by the difference in the electrostatic attractive force. At this time, if the voltage applied to all electrodes is cut off, the rotatory shifter 30 is returned to the initial state by an elastic energy stored in the lower support post 31. Here, the rotatory shifter 30 is comprised of the window 34 for allowing the light 35 to pass therethrough and the mask 33 for blocking the light 35. The rotatory shifter 30 is formed in a window shape in which a plurality of shutters of a window is closely arranged. At normal times, the rotatory shifter 30 allows the light 35 to pass therethrough. However, if the voltage is applied to a driving electrode, the shifting electrode 32 having a multi-staged driving structure formed with two or more windows is rotated to close up a space between the shutters of the window and thus block the light 35. According to the present invention, the initial state and the driving state may be applied to reverse order, i.e. FIGS. 4b and 4a may be respectively uses as the initial state and the driving state. Moreover, the support post 31 has a structure having a small resistant strength in a rotational direction while sufficiently supporting the shifting electrode 32 in a vertical direction. At this time, if a vertical strength of the support post 31 is too small, the rotatory shifter 30 may be stuck to the back glass substrate 20. Therefore, the support post 31 has an enough vertical strength to prevent the sticking phenomenon.

Figure 5A:
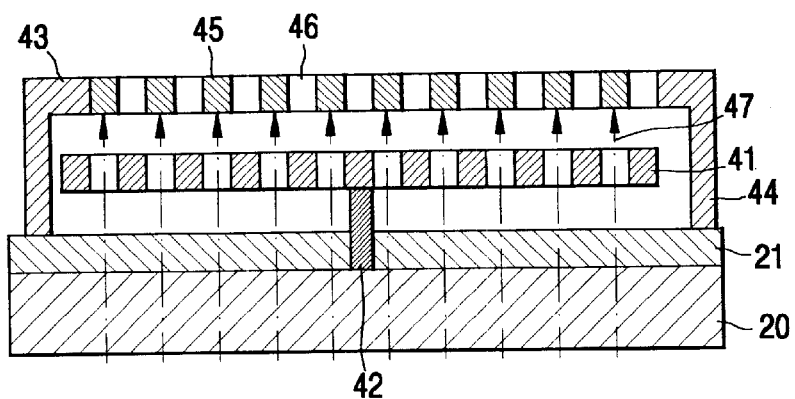
FIGS. 5a and 5b are cross-sectional views of operation principle of a horizontal shifting type micro-electromechanical device according to the present invention.
Figure 5B:
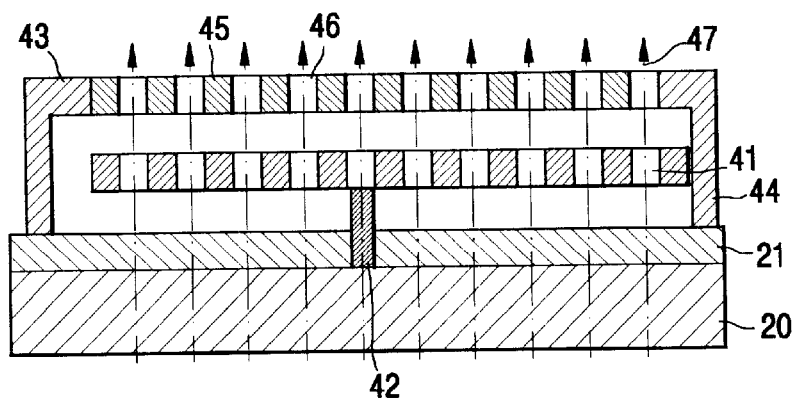

FIGS. 5a and 5b are cross-sectional views of operation principle of a horizontal shifting type micro-electromechanical device according to the present invention.

As shown in FIGS. 5a and 5b, a horizontal shifting type micro-electromechanical device 22 is comprised of a lower support post 42, an upper support post 44, a mask 45 and a window 46. The lower support post 42 supports a horizontal shifter 41, and the upper support post 44 supports an upper electrode 43. The lower support post 42 and the upper support post 44 are formed on the transparent electrode 21 of the back glass substrate 20. The mask 45 helps to switch light 47 and has a window 46.

FIG. 5a shows an initial state in which an electric field is not generated because an equal voltage is applied to the transparent electrode 21, the horizontal shifter 41 and the upper electrode 43. In this state, the horizontal shifter 41 is not horizontally moved and kept in a balanced state to completely block the light 47. If the light 47 from a light source is blocked, the light 47 does not arrive on the color filter layer 24. Therefore, a black color is displayed.

FIG. 5b shows a driving state in which the electric field is generated by a voltage difference between the voltage applied to the transparent electrode 21 and the upper electrode 43 and the voltage applied to the horizontal shifter 41. A free charge in the horizontal shifter 41 is horizontally moved by the electric field. That is, a fringe electric field and a vertical electric field is generated in a space in which the transparent electrode 21, the horizontal shifter 41 and the upper electrode 43 are placed. Therefore, an electrostatic force translationally moves the horizontal shifter 41. The light 46 is allowed to pass through the horizontal shifter 41 and the window 46 formed on the mask 45 of the upper electrode 43, and arrives to the color filter layer 24. The color filter layer 24 combines the red, green and blue colors to display a desired color. If the horizontal shifter 41 is moved, the lower support post 42 supporting the horizontal shifter 41 is elastically deformed. If the voltage applied to all the electrodes is cut off, the horizontal shifter 41, is returned to the initial state by an elastic energy stored in the lower support post 42.

According to the present invention, the initial state and the driving state may be applied in reverse order, i.e. FIGS. 5b and 5a may be respectively used as the initial state and the driving state.

In the present invention, the lower substrate is formed of a glass substrate by a micro-machining technology. On the lower substrate, there is formed the transparent electrode buried in an insulator, and a thin film electrode is formed thereon to be rotationally and horizontally moved. Then, a proper voltage is applied to the electrode formed at an upper space and the transparent electrode so as to move the electrode in a desired direction and thus switch the light.

As described above, the flat panel display according to the present invention is fabricated by a semiconductor processing technology for fabricating a mechanical structure having a size of a few μm to several hundred μm, i.e. micromachining technology. Therefore, the flat panel display of the present invention has a high efficiency in utilizing the light and can preferably display moving images. Since the precise semiconductor processing technology having a high productivity fabricates the micro-electromechanical device, the fabricating cost is remarkably reduced, and the pixel size of the display is more reduced.

Although the preferred embodiment of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A flat panel display, comprising:
   a back glass substrate having a transparent electrode of a transparent electric conductor;
   a front glass substrate having a color filter layer;
   a support beam arranged to support the back glass substrate and the front glass substrate; and
   a micro-electromechanical device formed at the transparent electrode to switch light; wherein the micro-electromechanical device comprises a rotatory shifter rotatably moved by an electrostatic force due to a voltage difference between a shifting electrode and the transparent electrode vertically spaced from the shifting electrode; a mask and a window formed at the rotatory shifter; and a support post arranged to support the rotatory shifter.

2. The flat panel display as claimed in claim 1, wherein the support post is formed to sufficiently support the rotatory shifter, while the rotatory shifter is smoothly rotated.

3. The flat panel as claimed in claim 1, wherein the mask and the window are arranged to block light or allow the light to pass therethrough.

4. The flat panel display as claimed in claim 1, wherein the micro-electromechanical device is configured to have a double wing shape or a single wing shape.

5. The flat panel display as claimed in claim 4, wherein the support post is formed to sufficiently support the rotatory shifter, while the rotatory shifter is smoothly rotated.

6. The flat panel display as claimed in claim 4, wherein the mask and the window are arranged to block light or allow the light to pass therethrough.

7. The flat panel display as claimed in claim 1, wherein the micro-electromechanical device is a reflecting type structure without a window.

8. The flat panel display as claimed in claim 7, wherein the support post is formed to sufficiently support the rotatory shifter, while the rotatory shifter is smoothly rotated.

9. The flat panel display as claimed in claim 7, wherein the mask and the window are arranged to block light or allow the light to pass therethrough.

10. The flat panel display as claimed in claim 1, wherein the rotatory shifter is a structure having 2 to 10 stages.

11. The flat panel display as claimed in claim 10, wherein the support post is formed to sufficiently support the rotatory shifter, while the rotatory shifter is smoothly rotated.

12. The flat panel display as claimed in claim 10, wherein the mask and the window are arranged to block light or allow the light to pass therethrough.

13. A flat panel display comprising:
    a back substrate having a transparent electrode of a transparent electric conductor;
    a front substrate having a color filter layer;
    a support beam arranged to support the back substrate and the front substrate; and
    a micro-electromechanical device formed on the transparent electrode to switch light, wherein the micro-electromechanical device comprises a lower support post for supporting a horizontal shifter, an upper electrode for helping an optical switching operation, an upper support post for supporting the upper electrode, and a mask and a window formed at the horizontal shifter and the upper electrode.

14. The flat panel display as claimed in claim 13, wherein said the lower support post is formed to sufficiently support the horizontal shifter.

15. The flat panel display as claimed in claim 13, wherein the mask and the window are arranged to block light or allow the light to pass therethrough.

16. The flat panel display as claimed in claim 13, wherein the horizontal shifter is translationally moved by a voltage difference between a voltage applied to the upper electrode and the transparent electrode and a voltage applied to the horizontal shifter.

17. A flat panel display, comprising:
    a back glass substrate having a first transparent electrode of a transparent electric conductor;
    a front glass substrate having a color filter layer and a second transparent electrode;
    a support beam arranged to support the back glass substrate and the front glass substrate; and
    a micro-electromechanical device formed at the first transparent electrode to switch light, wherein the micro-electromechanical device comprises:
      a rotatory shifter rotatably moved by an electrostatic force due to a voltage difference between a shifting electrode and the transparent electrode vertically spaced from the shifting electrode;
      a mask including windows formed on the rotatory shifter to block light or allow light to pass therethrough; and a support post extended from the back glass substrate, via the transparent electrode, to support and enable the rotatory shifter to move in response to the electrostatic force due to the voltage difference between the shifting electrode and the transparent electrode.

18. The flat panel display as claimed in claim 17, wherein the micro-electromechanical device is configured in a double wing shape or a single wing shape.

19. The flat panel display as claimed in claim 17, wherein the rotatory shifter is a structure having 2 to 10 stages.

20. The flat panel display as claimed in claim 17, where the support post is sufficiently elastic to accommodate movements of the micro-electromechanical device in response to the electrostatic force due to the voltage difference between the shifting electrode and the first transparent electrode or the voltage difference between the second transparent electrode and the rotatory shifter.

* * * * *